United States Patent [19]

Hughes

[11] 4,235,255
[45] Nov. 25, 1980

[54] TIRE INFLATION GUIDE

[76] Inventor: George W. Hughes, 2601 Mills, Houston, Tex. 77026

[21] Appl. No.: 96,761

[22] Filed: Nov. 23, 1979

[51] Int. Cl.³ .......................................... F16K 15/20
[52] U.S. Cl. .................................... 137/224; 137/860
[58] Field of Search ................... 137/224, 226, 516.15, 137/860

[56] References Cited

U.S. PATENT DOCUMENTS

| 1,156,328 | 10/1915 | Thayer | 137/226 |
| 2,757,685 | 8/1956 | Fritsch | 137/860 |
| 3,363,644 | 1/1968 | Malec | 137/860 X |
| 3,910,305 | 10/1975 | Hughes | 137/224 |
| 4,064,897 | 12/1977 | Weber | 137/224 |

Primary Examiner—Harold W. Weakley
Attorney, Agent, or Firm—Ranseler O. Wyatt

[57] ABSTRACT

An inflation guide for permanent mounting on a tire valve for preventing over inflation of the tire.

5 Claims, 1 Drawing Figure

TIRE INFLATION GUIDE

BACKGROUND OF THE INVENTION

In inflating vehicle tires, particularly due to the necessity in many instances of the driver having to do the inflating himself, and the usual situation, being without a tire gauge or at least without a reliable tire gauge, both over inflation and under inflation are experienced. It is the object of this invention to provide a tire gauge that will be mounted on the tire valve and that will prevent over inflation so that the user may apply air to the tire until the clear sound of air escaping from the guide indicates that maximum inflation has been reached. This is a modification of applicant's U.S. Pat. No. 3,910,305, this application covering a flexible o-ring for the expanding means, which may be of any predetermined Shore Durometer hardness to provide means for use of the inflation guide on a variety of tires by merely changing said o-ring.

SUMMARY OF THE INVENTION

A tire inflation guide having a tubular housing, a tire valve reception chamber in the lower end of said housing and an upper chamber formed above said reception chamber in which an insert is mounted having air passageways leading from the lower chamber to outlets in the upper chamber wall and external flanges on the outer surface on said upper chamber receiving a flexible o-ring of a pre-selected Shore Durometer hardness which covers said outlets and yields to a pre-selected pressure.

BRIEF DESCRIPTION OF THE DRAWINGS

The FIGURE shows a side elevational view of the device, in cross-section.

DESCRIPTION OF THE PREFERRED EMBODIMENTS

Figure 1:
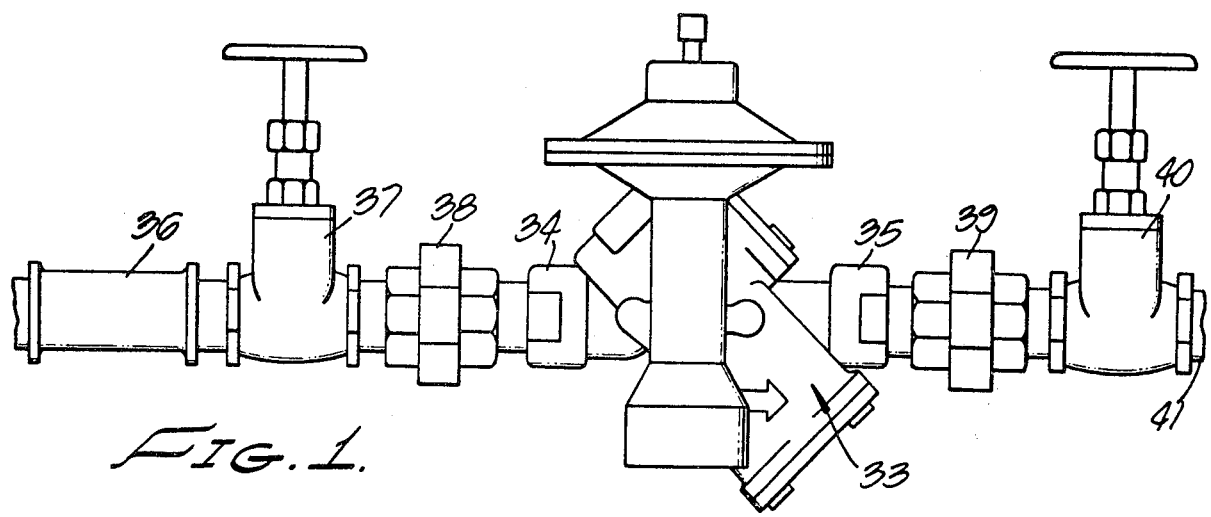
Figure 2:
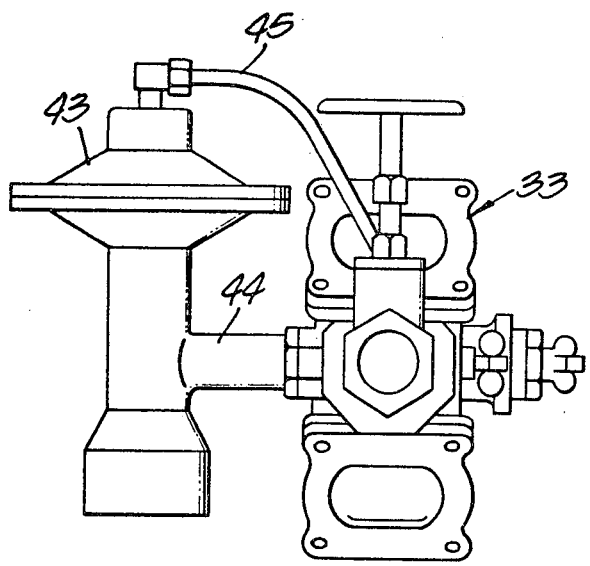
Figure 6:
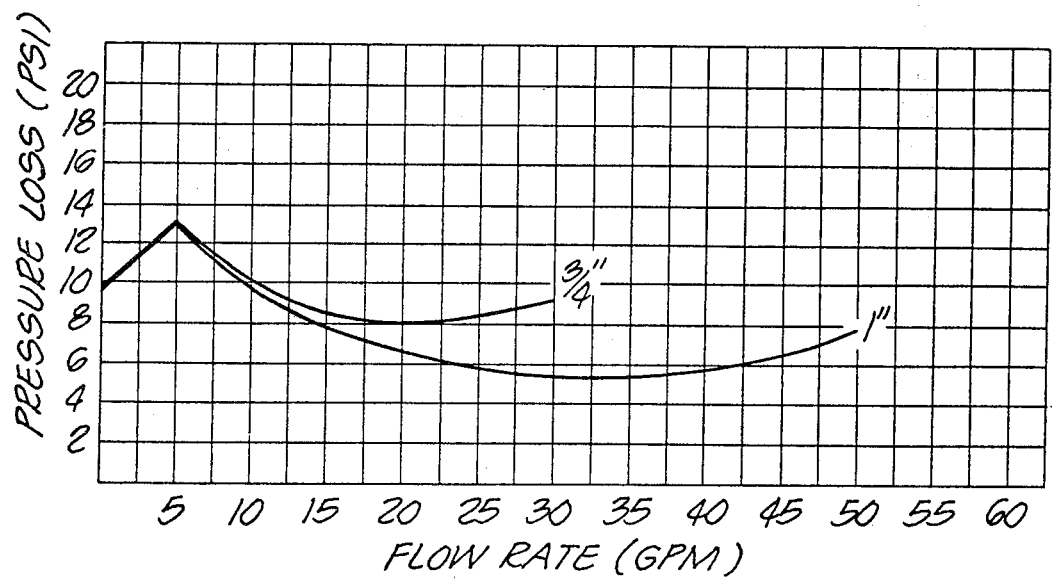
Figure 3:
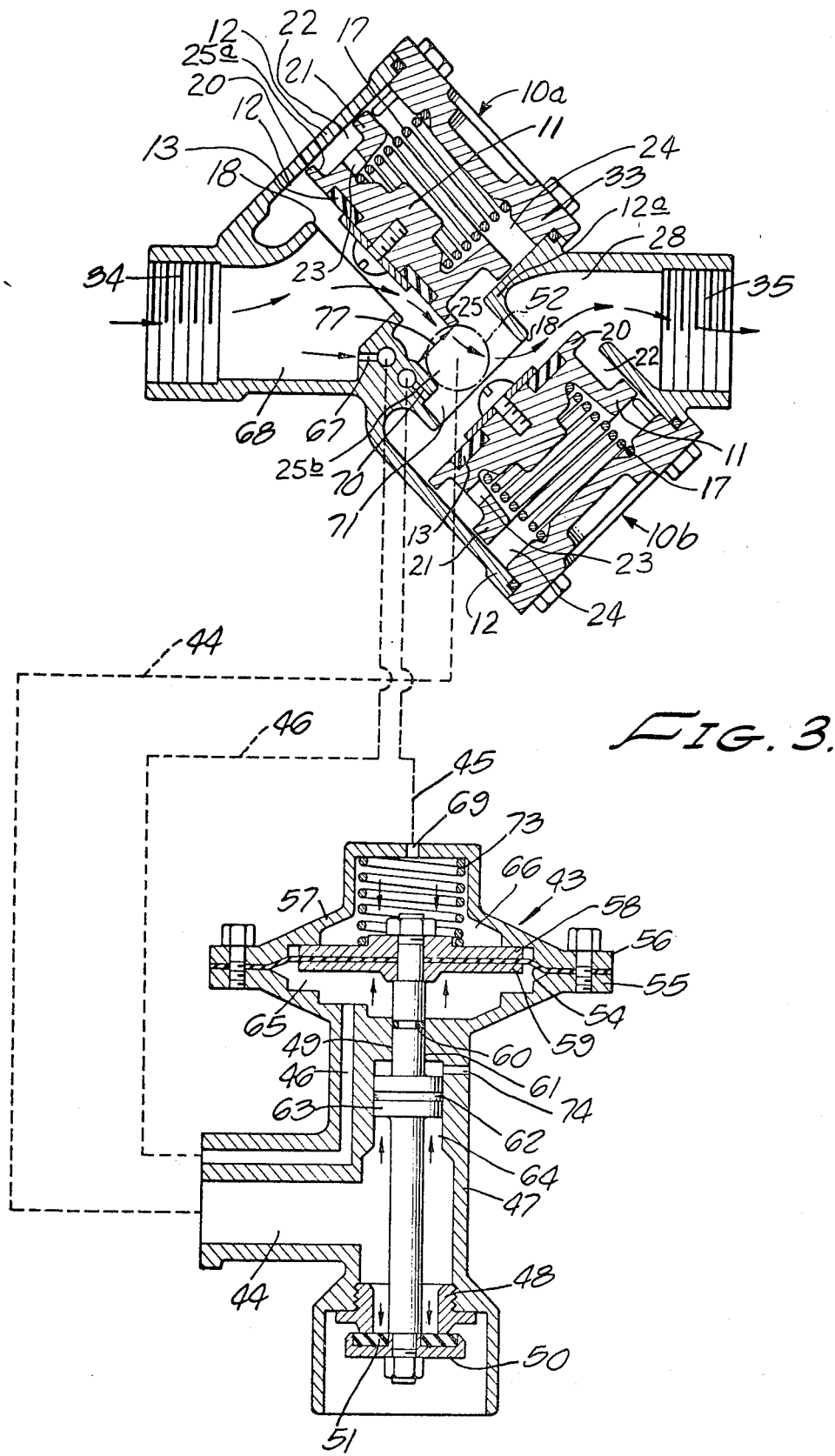
Figure 4:
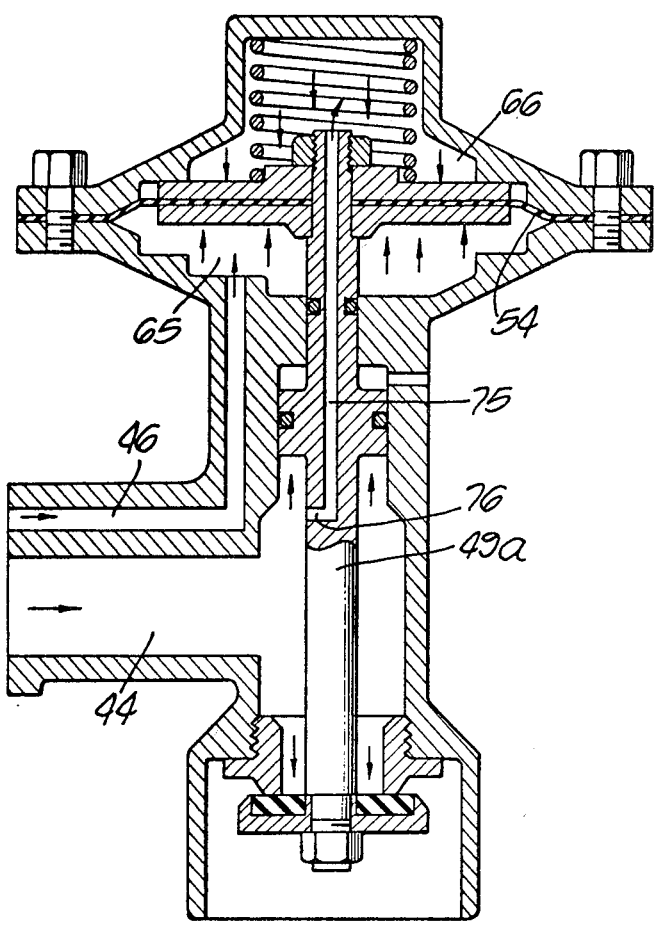
Figure 5:
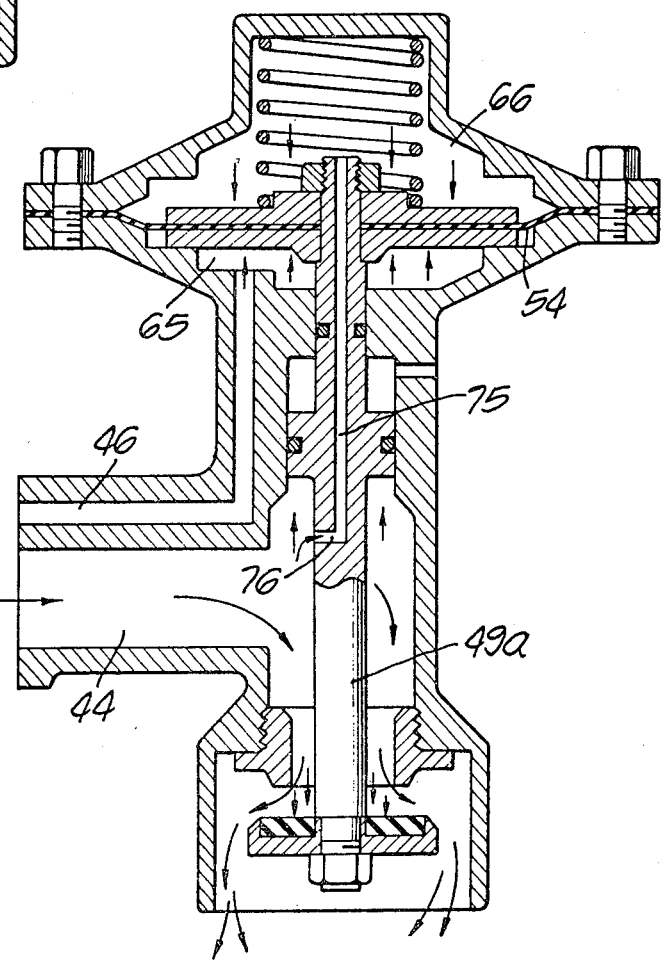

Numeral 1 designates a tubular housing having an upper chamber 2 and lower chamber 3. The internal area of the lower chamber has threads as 4 to receive external threads of the standard tire valve stems as 5. The upper chamber 2 of the housing 1 has the annular insert 6 mounted therein which is provided with a plurality of air channels 7, 7 terminating at one end in the lower chamber 3 and at the other end in an annular groove as 8 formed in the inside wall of the upper chamber 2. Air outlets 9, 9 extending transversely through the side wall of the housing 1, are normally blocked by the yieldable o-ring 10 mounted in the groove 11 in the outer face of the housing 1. Annular flanges 12, 12 extending outwardly from the outside surface of the housing 1 provide guards against inadvertent dislodging of said o-ring. A valve member 14 is mounted on a spring 13 in the upper chamber 2, the head 15 of the member 14 seating against the inwardly turned upper end wall of the housing 1.

The housing 1 is mounted on the usual tire valve 3 and the o-ring 10 is of a pre-selected Shore Durometer hardness to yield at a pre-selected pressure. The usual air supply hose nozzle (not shown) is applied to the valve member 15, depressing same and permitting air to flow into the housing 1, the lower end of the stem 14 bearing against and depressing the valve stem 16 of the valve 5, permitting air to enter the tire. The air pressure of the tire will bear against the o-ring 10, and as the pressure in the tire reaches the pre-selected pressure, the o-ring 10 will yield, permitting escape of the air through the ports 9, which will be an audible escape, indicating to the user that the desired pressure in the tire has been reached. The air supply hose nozzle (not shown) will be removed from the head 15, causing the valve stem 14 to rise releasing the valve stem 5 and sealing the air in the housing.

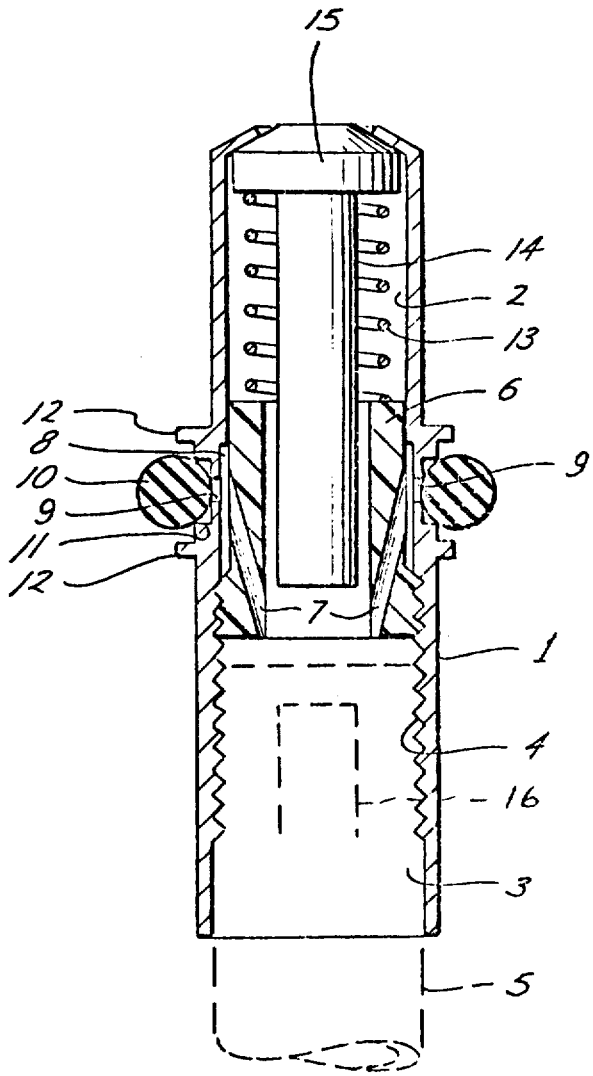

What I claim is:

1. A tire inflation guide having a tubular housing, internal threads in said housing adjacent its lower end adapted to mount the housing on the usual tire valve, an insert in the housing having air passageways extending transversely there through, a plurality of ports in flow connection with said air passageways, a flexible o-ring mounted on the outer surface of the housing and over said air outlets, a valve stem in the upper portion of said housing yieldably maintained in close position and adapted to be moved downwardly against the end of the stem of the valve of the tire to permit flow of air therein.

2. The device defined in claim 1, wherein said air passageways in said insert are downwardly inclined leading from the air outlets to the lower portion of the housing.

3. The device defined in claim 1 wherein the pressure in the tire required to open the air passageways through the housing is determined by the Shore Durometer hardness of the o-ring mounted on the housing.

4. The device defined in claim 1 wherein the air passageways through the insert extend from the lower portion of the housing outwardly to approximately midway thereof, an internal groove provides a receiving chamber for the air through the air passageways, and an external groove in the wall of said housing provides a seat for the o-ring blocking said air passageways.

5. The device defined in claim 1 wherein said housing has an external angular groove to receive said o-ring and has external outwardly extending flanges adjacent each side margin of said groove to protect said o-ring from inadvertent dislodgement.

* * * * *

UNITED STATES PATENT AND TRADEMARK OFFICE
CERTIFICATE OF CORRECTION

PATENT NO. : 4,235,255
DATED : November 25, 1980
INVENTOR(S) : George W. Hughes

It is certified that error appears in the above—identified patent and that said Letters Patent is hereby corrected as shown below:

On The Title Page, delete the drawing figure and Sheets 1, 2 and 3. Insert the 1 drawing figure as shown on the attached sheet.

Signed and Sealed this

Twenty-ninth Day of September 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,235,255

DATED : November 25, 1980

INVENTOR(S) : George W. Hughes

It is certified that error appears in the above—identified patent and that said Letters Patent is hereby corrected as shown below: